INVENTOR.
RAYMOND E. NOVKOV
BY J. William Freeman
ATTORNEY

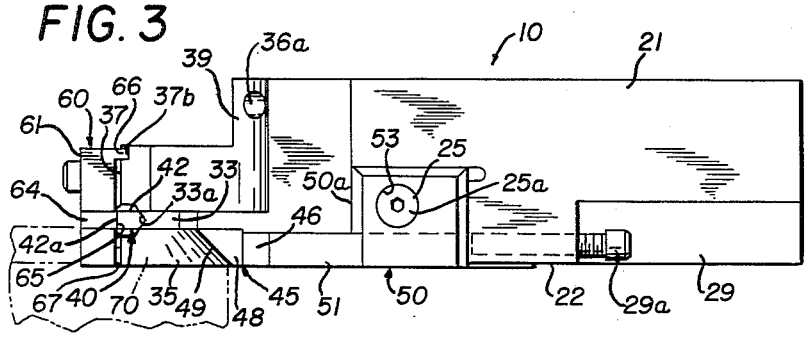
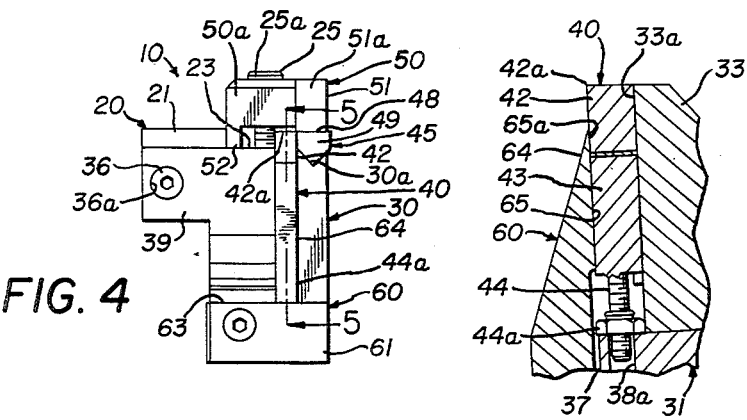
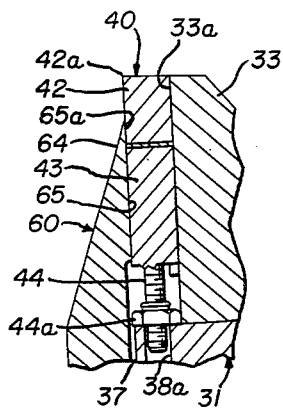
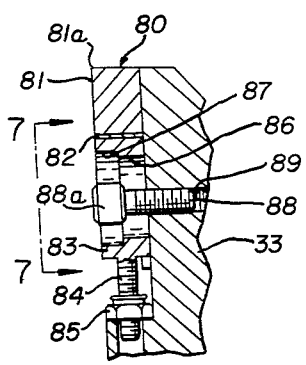
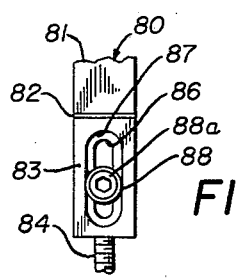

United States Patent Office 2,940,160
Patented June 14, 1960

2,940,160
COMBINATION CUT-OFF AND CHAMFERING TOOL

Raymond E. Novkov, 1026 Seward, Akron, Ohio

Original application June 19, 1956, Ser. No. 592,436. Divided and this application May 7, 1958, Ser. No. 733,591

9 Claims. (Cl. 29—97)

This invention relates to the art of machine tools and in particular has reference to an improved type of cut-off or parting tool that effectuates a combined chamfering and cut-off operation during use thereof.

It has long been known in the prior art that a length of work can be cut or trimmed into a shorter length during the supported rotational movement thereof by the application of a cutting tool against the rotating external surface of the work. In the great majority of cases, such cut-off operations are effectuated by the use of a lathe with the work being rotatably supported about its axis over the lathe bed while the cut-off tool is secured to a cross-slide carriage so as to move transversely of the lathe bed and thus engage the rotating work surface.

To the present time, cut-off tools of known construction have been characterized by their inability to fully attain one or more of the following desired requirements:

First, the cutting edge per se of the cutting tool must be positioned so that the same will move along a radial plane that extends to the center line of the work as defined by its position of mounting on the tail stock or face plate of the lathe. This requirement assures correct contact between the cutting edge and revolving work piece.

In instances, the prior art has failed in this requirement because of the fact that the cutting tool upon being repositioned after removal for sharpening, for example, is not correctly relocated in the carriage tool holder of the cross slide and, accordingly, the cutting surface is not positioned in the required horizontal plane that is above described.

The second requirement of correct cut-off tool construction is that the cut-off bit per se be rigidly and solidly supported at all times during the cut-off operation, so that any detrimental vibration or "chatter" is avoided. The "quick change" requirements of present-day machine tool practice has heretofore limited the amount of support that can be utilized, with the result that conventional cut-off tools at the present time are almost without exception, possessive of varying degrees of vibrational "chatter" which, accordingly, limits the efficiency of the cut-off operation.

A third requirement for the theoretically ideal cut-off tool is that the tool bit per se and the support plate therefor be capable of rapidly dissipating the relatively high temperatures that occur at the point of cut, so as to avoid premature tool damage that occurs as a result of hot chips welding to the cutoff tool upon their removal from the work piece during the cut-off operation.

A third requirement for the theoretically ideal cut-off tool is that the tool bit per se and the support plate therefor be capable of rapidly dissipating the relatively high temperatures that occur at the point of cut, so as to avoid premature tool damage that occurs as a result of hot chips welding to the cut-off tool upon their removal from the work piece during the cut-off operation.

In co-pending application, Serial No. 557,785, filed January 6, 1956, by Raymond E. Novkov, there was disclosed an improved type of cut-off tool that met each and every one of the above requirements and which featured the use of a cutting bit that was disposed in a substantially tangential plane to the path of movement of the work being cut.

In this regard, it is found that the greatest force resisting cutting action was directed tangentially of the rotating work and, accordingly, if the cutting tool was arranged so as to have its longitudinal length disposed in this tangential plane, it was found that the same would absorb the cutting force of its longitudinal length.

By way of contrast, in devices where the cutting bit is disposed in a radial plane, the cutting point will be disposed substantially normal to the direction of force, with the result that the force as received by the blade will tend to bend or flex the same throughout its longitudinal length.

Thus, by featuring a cut-off tool that is disposed substantially in the line of the cutting force tangential to rotating work, the cutting bit per se is capable of absorbing this force throughout its longitudinal length with the result that improved cutting action will occur in such case.

While the above described type of cut-off tool featuring a tangentially disposed cut-off cutting bit, per se, has been found satisfactory in usage, it has been found that it is desirable in many cases to provide a chamfering operation after the cut-off has been effectuated. In present day practice, this requires a separate set-up and cutting operation, with the result that additional time is consumed to thus add to the overall cost of the operation being performed. In co-pending application, Serial 505,488, filed May 2, 1955, by Raymond E. Novkov, there is disclosed an improved type of cut-off tool that is disposed in a radial plane and it has been found that, by providing this type blade for chamfering action in cooperation with the tangentially disposed cutting bit used in the cut-off operation per se, that the material can be cut off and the remaining stock chamfered at its peripheral edges during the same cutting operation.

It accordingly becomes the principal object of this invention to provide an improve type of cut-off tool teaching the use of a tangentially disposed cut-off bit in combination with a radially disposed chamfering bit for effectuating a combined cut-off and chamfering operation.

It is the further object of this invention to provide a cut-off tool of the character described that includes, in combination for co-action with each other, a pair of cutting bits, one of which performs a cutting operation, while the other performs a chamfering operation automatically upon completion of the cut-off.

It is a still further object of this invention to provide an improved cut-off tool characterized by the presence of two cutting bits operable in co-action with each other and having the spacing therebetween adjustable so that a combined cut-off and chamfering action can be obtained on revolving pieces of different diameters.

It is the still further object of this invention to provide a combination cut-off and chamfering tool of the character described that is efficient in use and economical to produce.

These and other objects of the invention will become more apparent upon a reading of the following brief specifications considered and interpreted in the light of the accompanying drawings.

Of the drawings:

Figure 3 is a plan view of the combination cut-off tool during the machining operation.

Figure 4 is a front elevation of the improved combination tool.

Figure 5 is a view taken on the lines 5, 5 of Figure 4.

Figure 6 is similar to Figure 5, but is illustrating a modified form of the invention.

Figure 7 is a view taken on the lines 7, 7 of Figure 6.

Figures 1, 2:
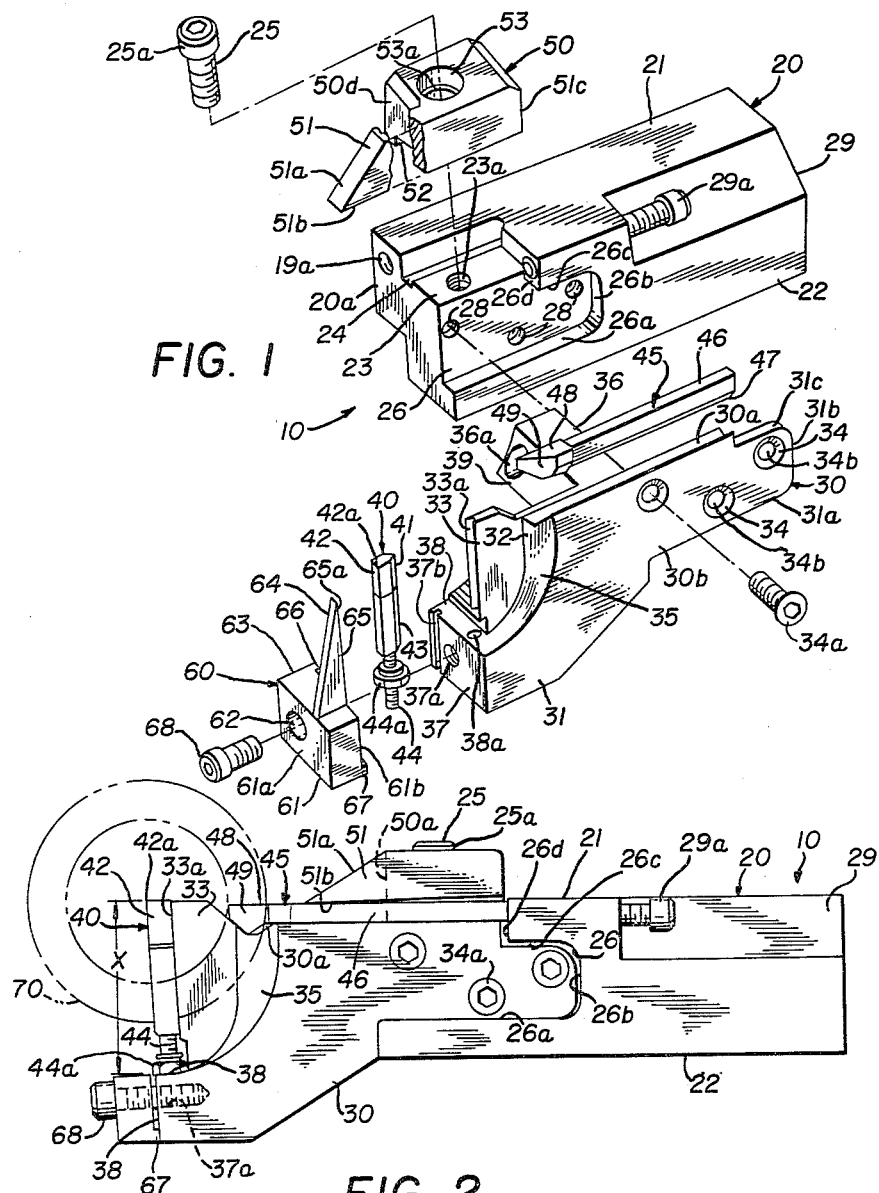
Figure 1 is an exploded perspective view of the improved tool.
Figure 2 is a side elevation of the combination tool being used to effectuate a combined cut-off and chamfering operation, and showing a chain-dotted line revolving work piece.

Referring now to the drawings and particularly to Figure 1 thereof, the improved combination cut-off and chamfering tool, generally indicated by the numeral 10, is shown including a tool body 20, to which is releasably secured a bit-supporting member 30 that receives on appropriate edge portions thereof a cutting bit 40 and a chamfering bit 45; the arrangement being such that clamping blocks 50 and 60 are releasably secured to the body 20 and the member 30 respectively so as to retain the chamfering bit 45 and the cutting bit 40 with respect to the member 30, as will presently be described.

Considering first the structure of the tool body 20, it will be seen from the Figure 1 of the drawings that the same is shown as being of L-shaped cross-sectional configuration wherein a top surface 21 and an abutting side surface 22 are provided for co-action with the members 50 and 30 respectively, with flange portion 19 being received within the turret head of a lathe in known manner to support the overall tool body 10 during the combined cut-off and chamfering operation.

For the purpose of receiving the clamping block 50, the surface 21 of the tool body 20 is undercut adjacent its front and side marginal edge portions to define a shallow recess that includes a supporting surface 23 and a longitudinally extending groove 24 with both the surface 23 and groove 24 being located below the plane of surface 21 so as to provide a seat for the complementally shaped clamping block 50. Additionally, the surface 23 includes a tapped aperture 23a that receives a clamping bolt 25 that functions in known manner to fix the clamping block 50 with respect to the surface 23 and the groove 24.

By like token, the side surface 22 of the tool body 20 is shown undercut adjacent its front edge portion to define a recessed surface 26 that is bounded by wall surfaces 26a, 26b, 26c and 26d, as well as the frontal surface 26e of the tool body 20, so as to permit the bit-supporting member 30 to have a flat portion thereof receivable against the surface 26 as will be described.

In order that the bit-supporting member 30 may be abutted firmly against the surface 26, the same (surface 26) further includes a plurality of tapped apertures 28, 28, the spacing and arrangement of which will be described in greater detail in ensuing paragraphs.

As best shown in Figure 1 of the drawings, the rear portion of the tool body 20 is provided with a bevelled surface 29 that intersects with surfaces 21 and 22 to provide an access area that can be utilized for turning a threaded bolt 29a, the latter being threadingly operable longitudinally of one edge portion of the body 20 to advance the chamfering insert 45 relatively of the bit-supporting member 30 when the same has been positioned in assembled condition as will be described.

Considering next the detailed structure of the bit-supporting member 30 per se, it will be seen from Figures 1 to 4 of the drawing that the same includes a shank portion, indicated generally by the numeral 30b, that integrally joins an enlarged head portion indicated by the numeral 31, with these shank and head portions 30b, 31 defining a longitudinal slot 32 within which may be received a blade support 33, having a V-shaped front edge 33a against which may be received the cutting bit 40, while the chamfering bit 45 is received against a V-shaped groove 30a that is defined by the shank portion 30b.

As is best shown in Figure 1 of the drawings, the shank portion 30b further includes counter-sunk apertures 34, 34 that are arranged for alignment with the apertures 28, 28. In this regard, it is to be understood that similar apertures 34b, 34b are provided forwardly in the shank portion for coaction with the blade support 33 that is retained within slot 32 upon tightening of bolts through this second set of apertures 34b, 34b. As is explained in co-pending application, Serial No. 505,488, filed May 2, 1955, by Raymond E. Novkov, the apertures 28, 28 that are provided in the face 26 of tool body 20 are slightly out of alignment with the counter-sunk apertures 34, 34, with such purposeful misalignment being provided for the purpose of drawing edge portions 31a, 31b, and 31c of shank 30b into tight abutment with the wall surfaces 26a, 26b, and 26d respectively that are provided on the tool body 20.

In order that clearance may be provided for emission of chips cut by the chamfering bit 45, the front or leading edge of the shank portion 30b is shown defined by an angularly disposed surface that is indicated by the numeral 35 with this surface 35 being arcuately formed for clearance with respect to the revolving work piece.

Similarly, while the cutting bit 40 is supported against the V-shaped edge 33a as a result of positioning of the clamping block 60 as will be presently described, the enlarged head portion 31 further includes an auxiliary support portion 36, having an aperture 36a through which a bolt can be secured so as to secure the portion 36 against the frontal face 20a of the tool body 20, with an aperture 19a being provided on the face 20a for the purpose of receiving a bolt that is passed through the aperture 36a. As before, this auxiliary mounting portion 36 includes an arcuate face 39 that provides clearance for the revolving work piece.

In addition to the aforementioned component parts, the enlarged head portion 31 includes further a frontal face 37 having a tapped aperture 37a and a vertical groove 37b, both of which coact with the clamping block 60, while tapped aperture 38a is provided on horizontal (Figure 2) face 38 so as to receive one axial end of the cutting bit 40 so that the same may be abutted against the V-shaped edge 33a.

Considering next the detailed structure of the cutting bit 40 per se, it will be seen that the same is of an elongated configuration having a V-shaped frontal edge 41 that is complementally received within the V-shaped edge 33a of blade support 33. In the preferred embodiment of the invention disclosed herein, the cutting bit 40 is made up of two elongated portions 42 and 43 with the portion 42 being a carbide insert, for example, while the shank or base portion 43 may be of steel, if desired. A threaded integral extension 44, projecting from the shank portion 43, has threadingly received thereon an adjustment nut 44a that operates to vertically space and axially locate the cutting bit 40 along the V-shaped edge 33a as is best shown in Figure 5 of the drawings.

The elongated chamfering bit 45 is of similar elongated configuration and may include a shank portion 46 having a V-shaped edge 47 thereon that is complementally received within the V-shaped groove 30a of the shank 31. A head, or chamfering end 48 of the chamfering tool 45, is normally formed of carbide material and has an angularly disposed cutting face 49 that overlies the angularly disposed surface 35 as best shown in Fig. 3 of the drawings.

Referring now to Figures 1, 2, 3 and 4 of the drawings for a detailed description of the clamping block 50, per se, it will be seen that the same is defined by a substantially rectangular body section that includes an integral extension arm 51 that projects from the front surface 50a thereof so as to longitudinally overlie the chamfering bit 45 when the same is positioned against the V-shaped edge 30a as is shown in Figures 2, 3 and 4 of the drawings. In order that a degree of cantilever support between the arm 51 and the chamfering bit 45 be provided adjacent the free end 51a of the arm 51, the bottom surface 51b of arm 51 is shown tapered longitudinally between the spaced end portions 51a and 51c thereof, with the degree of taper being shown in a somewhat exaggerated condition in Figure 2 of the drawings for the sake of clarity. It is to be understood that a taper in the nature of one or two degrees could be employed without changing the principle herein involved.

In order that this tapered surface 51b of the arm 51 will longitudinally overlie the chamfering bit 45 positioned on groove 30a of member 30, the block 50 further includes a transversely spaced, longitudinally extending flange 52 that descends downwardly from the lower surface 50b of the block 50 to seat in the groove 24 of the tool body 20 upon attachment of block 50 to the body 20 as a result of bolt 25 being passed through aperture 53 in block 50, for reception in aperture 23a, it being understood that this aperture 53 includes a shoulder 53a against which a head of bolt 25 may be positioned so as to draw the clamping block 50 into firm engagement with the chamfering bit 45 upon turning of head 25a thereof in known manner.

With reference now to the construction of the support of the clamping block 60, it will be seen that the same includes a base portion 61 of generally rectangular configuration, which base portion 61 is provided with an aperture 62 that extends between the opposed faces 61a and 61b thereof for purposes to be described.

One edge portion 63 of the base 61, further defines a projecting arm 64 of generally tapering cross-sectional configuration that defines a clamping surface 65 that is inclined slightly with respect to the plane of the surface 61b so as to permit the extreme end 65a thereof to initially contact the surface of the clamping bit 40 as will be presently described. In addition to the aforementioned component parts, the face 61d further includes a transversely extending rib 66 as well as a small projection 67 (see Figure 1) that is designed to engage against the surface 37 with the rib 36 being received in the groove 37b of surface 37 while the projection 67 abuts against the surface 37 at a spaced point therefrom. Bolt 68 passing through aperture 62 for reception in aperture 37a facilitates retention of the block 60 with respect to the bit-supporting member 30, so that upon tightening of the bolt 38, the clamping surface 65 of arm 64 will be tightly urged into contact with the cutting bit 40, with the leading edge 65a thereof first contacting the bit 40.

In use or operation of the improved cut-off tool 10, it will be first assumed that the bit-supporting member 30 has been secured with respect to the tool body 20 as previously described and further that the cutting bit 40 and the chamfering bit 45 have been seated with respect to V-shaped surfaces 33a and 30a respectively and are being retained in place thereon as a result of the clamping blocks 50, 60 being positioned in engagement therewith.

At this time, the tool is ready for use in a combination cut-off and chamfering operation and to this end the flange portion 19 may first be conveniently positioned in a lathe, for example, and fixedly retained therein in known manner. With such assembly completed and the tool positioned, the overall device 10 will assume the combination shown in Figures 2, 3 and 4 of the drawings and in this condition the same may have the cutting edge 42a of cutting bit 40 advanced into a piece of rotating work R that is indicated in chain-dotted line in Figs. 2 and 3 of the drawings.

In the condition of Figure 2, a cut has been made by a gradually advancing cut-off tool 10 to the left of Figure 2 so that when the condition shown in Figure 2 is reached, the cutoff operation is substantially complete. At this time, it will also be noted that there has been effectuated a chamfering action that results in the creation of a chamfered surface indicated by the chain-dotted line designation 70 in Figures 2 and 3 of the drawings.

During the movement of the component parts to the position of Figure 2, it is believed apparent that the cutting edge 42a of the cutting bit 40 will have effectuated a cut-off operation with the cutting force that is created during such operation being absorbed throughout the longitudinal length of the cutting bit 40 which is seated against a head 31 as clearly shown in the drawings.

Similarly, as a result of the tapered cutting surface 49 contacting the revolving work piece R during movement to the left of Figures 2 and 3, it is apparent that this surface will effectuate a chamfer cut that results in the creation of the aforementioned surface 70. During the time that this chamfering operation is occurring, it is believed apparent that the revolving work piece will clear the surface 35 so as to obviate interference between these parts.

In the event it is desired to replace either of the cutting bit 40 or the chamfering bit 45, it is merely necessary that the appropriate clamping block 50 or 60, as the case may be, be unloosened as a result of the backing off the retaining screws used thereon. Upon such loosening either the cutting bit 40 or the chamfering bit 45 may be easily removed.

With respect to the adjustment of the positioning of the bit 45 with respect to bit 40, it is believed apparent that the screw 29 will determine the location of the bit 45 with respect to the center line of the work being machined, while the cutting bit 40 may be set to a pre-determined height by merely adjusting the nut 44a upon the threaded shank portion 44 thereof. In this manner, a uniform distance can be maintained between the bottom of the threaded bolt 44a and the cutting surface 42a with the result that upon pre-setting of this device the same can merely be replaced in the aperture 38 so as to have the cutting edge 42a provided at a proper height X (see Figure 2) above the surface 38.

In the event the support blade 33 is damaged for any reason whatsoever during the machining operation, it will be seen that in the preferred form of the invention above discussed wherein the same is made removable, that this support blade 33 can be easily removed by merely backing off the screw members that are received in apertures 34b, 34b with the result that the blade can be easily removed and a new blade simply and accurately repositioned within the slot 32 that is provided in the bit-supporting member 30.

The modified form of the invention shown in Figures 6 and 7 of the invention is substantially identical with that described in connection with Figures 1 to 5 hereof, and, accordingly, where indicated, like numerals designate like parts.

In this preferred form of the invention, however, a modified cutting bit 80 is utilized that includes a carbide portion 81, having a cutting edge 81a, with the carbide cutting portion 81 being longitudinally abutted as at 82 to a shank portion indicated by the numeral 83. As before, this shank portion 83 has a threaded end extension 84 about which may be received a nut 85 for determining the height of the cuttings of edge 81a. In view of the fact that this modified form of the invention contemplates the elimination of the clamping block 60, the shank portion 83 further includes a central slot 86 having a counter-sunk shoulder slot 87 against which may be abutted a head 88a of a bolt 88 that is received in tapped aperture 89 provided in the end of the blade support 33. In this manner, the head 88a of a bolt 88, acting against shoulder 87, as shown best in Figure 7, will retain the overall cutting bit 80 with respect to the front edge portion of the support blade 33.

In use or operation of this modified form of the invention as shown in Figures 6 and 7, the component parts are assembled exactly as before with the exception that the bolt 88 is threaded into the aperture 89 in support blade 33 so as to hold the cutting bit 80 against the frontal edge portion thereof. With the device positioned as just described, the combined cutoff and chamfering operation may be effectuated in the manner above described.

It will be seen from the foregoing that there has been provided a new and novel type of combination cut-off and chamfering tool that is capable of being used in a multitude of machining operations. It has further been shown how the relative adjustment that is possible between the cutting bit and the chamfering bit permits the use of this combined tool on several different sizes of bar stock, in view of the fact that the distance between the chamfering bit and cutting bit can be regulated radially of the cutting point of contact between the cutting bit 40 and the rotating work. In this manner the chamfering tool can be adjusted so as to come into action after the cutting bit has passed through a predetermined amount of the rotating work, and in this manner, any desired size and amount of chamfering can be provided by merely adjusting the threaded bolt 29.

It is also believed important to note that the support blade of this invention could be copper-plated so as to achieve a rapid dissipation of heat in the critical cutting area. Particular reference is also to be noted with respect to the structure of the cutting tool per se that is employed in this invention. It has been shown in the preceding paragraphs how the use of such a cutting tool having independent adjustment means carried by the same, permits a pre-setting of the overall effective length of this cutting bit with the result that the same can be easily removed for grinding and then subsequently replaced without affecting in any way the critical cutting height of the cutting edge thereof.

While a detailed description of the invention has been made in accordance with the requirements of the patent statutes, it is to be understood that the invention is not to be so limited, and, accordingly, modifications of the invention may be resorted to without departing from the spirit hereof or the scope of the appended claims.

This application is a continuation, in part, of copending application Serial Number 441,305, filed July 6, 1954, and now United States Patent 2,737,205; is also a continuation, in part, of copending application Serial Number 505,488, filed May 2, 1945, by Raymond E. Novkov, and is a divisional application of copending application Serial Number 592,436, filed June 19, 1956, by Raymond E. Novkov.

What is claimed is:

1. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; means for releasably retaining said bit in position on said bit support and said support blade; and means for adjusting said bits relatively of each other; said bits having their cutting edges disposed in different planes of cut.

2. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; means for releasably retaining said bit in position on said bit support and said support blade; and means for adjusting said bits relatively of each other; said bits being elongate and being angularly disposed with respect to each other.

3. The device of claim 2, further characterized by the fact that one said bit is a cut-off bit, while the other bit is a chamfering bit.

4. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; and means for retaining said bits against said bit-receiving surface and edge portions; said retaining means including a clamping block carried by said tool body and having an edge received against said first bit, said bit being disposed at different angles to each other and having their cutting edges disposed in different planes.

5. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; and means for retaining said bits against said bit-receiving surface and edge portions; said retaining means including a clamping block carried by said tool body and having an edge received against said first bit; and a second clamping block carried by said bit support and having an edge received against said second bit said bit being disposed at different angles to each other and having their cutting edges disposed in different planes.

6. The device of claim 4 further characterized by the fact that said support blade is provided with a tapped aperture on its forward bit-receiving edge and said second bit has an elongate slot therethrough, whereby a bolt passed through said slot and received in said aperture retains said bit against said edge.

7. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; means for releasably retaining said bit in position on said bit support and said support blade; and means for adjusting said bits relatively of each other; said means including adjustment means for shifting said first bit relatively of said bit-receiving surface of said bit support said bit being disposed at different angles to each other and having their cutting edges disposed in different planes.

8. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; means for releasably retaining said bit in position on said bit support and said support blade; and means for adjusting said bits relatively of each other; said means including adjustment means for shifting said first bit relatively of said bit-receiving surface of said bit support; said adjustment means including a threaded bolt carried by said body and having its free end received against one end of said first bit said bit being disposed at different angles to each other and having their cutting edges disposed in different planes.

9. A combination cut-off and chamfering tool of the character described, comprising; a tool body having forward and top edge surfaces; a bit support, releasably secured to said tool body and having a bit-receiving surface disposed in substantially parallel relationship with said top edge; a support blade releasably secured with respect to said tool body and said bit support and having a bit-receiving edge portion disposed forwardly of said forward edge of said tool body; a first bit received against bit-receiving surface of said bit support; a second bit received against said bit-receiving edge portion of said support blade; means for releasably retaining said bit in position on said bit support and said support blade; and means for adjusting said bits relatively of each other; said means including adjustment means for shifting said second bit relatively of said bit-receiving edge of said support blade said bit being disposed at different angles to each other and having their cutting edges disposed in different planes.

References Cited in the file of this patent

UNITED STATES PATENTS

| | | |
|---|---|---|
| 1,096,977 | White | May 19, 1914 |
| 1,223,438 | Spencer | Apr. 24, 1917 |
| 1,815,518 | Luers | July 21, 1931 |
| 1,919,738 | Melling | July 25, 1933 |
| 2,402,650 | Maffia | June 25, 1946 |

FOREIGN PATENTS

| | | |
|---|---|---|
| 144,902 | Germany | May 3, 1901 |
| 877,399 | Germany | May 21, 1953 |